(12) United States Patent
Nakahara et al.

(10) Patent No.: US 8,101,886 B2
(45) Date of Patent: Jan. 24, 2012

(54) WELDING ARTICLE AND WELDING METHOD OF CARRYING OUT AN ALTERNATING CURRENT ARC WELDING

(75) Inventors: Keiji Nakahara, Yokohama (JP); Emi Yanagihara, Toyohashi (JP); Shunzo Aoyama, Toyohashi (JP); Yasushi Kanno, Toyohashi (JP)

(73) Assignees: Yorozu Corporation, Yokohama-shi (JP); Ahresty Corporation, Tokyo (JP)

( * ) Notice: Subject to any disclaimer, the term of this patent is extended or adjusted under 35 U.S.C. 154(b) by 310 days.

(21) Appl. No.: 12/373,212

(22) PCT Filed: Jul. 6, 2007

(86) PCT No.: PCT/JP2007/063568
§ 371 (c)(1),
(2), (4) Date: Apr. 6, 2009

(87) PCT Pub. No.: WO2008/007620
PCT Pub. Date: Jan. 17, 2008

(65) Prior Publication Data
US 2009/0230108 A1    Sep. 17, 2009

(30) Foreign Application Priority Data
Jul. 11, 2006    (JP) ................................ 2006-190355

(51) Int. Cl.
B23K 9/09    (2006.01)
(52) U.S. Cl. ........... 219/137 PS; 219/130.51; 219/130.5
(58) Field of Classification Search ............... 219/130.5, 219/130.51, 137 PS
See application file for complete search history.

(56) References Cited

U.S. PATENT DOCUMENTS

| | | | |
|---|---|---|---|
| 5,225,660 A | | 7/1993 | Mita et al. |
| 5,349,159 A | | 9/1994 | Mita et al. |
| 5,990,445 A | * | 11/1999 | Ogasawara et al. ........ 219/130.5 |
| 6,365,874 B1 | * | 4/2002 | Stava ........................ 219/130.51 |
| 6,376,802 B1 | * | 4/2002 | Tong et al. .............. 219/137 PS |
| 6,600,135 B2 | * | 7/2003 | Tong ........................ 219/137 PS |
| 7,271,365 B2 | * | 9/2007 | Stava et al. ............... 219/130.51 |
| 2005/0220660 A1 | * | 10/2005 | Fukuchi et al. ............... 420/534 |
| 2005/0274776 A1 | | 12/2005 | Takeda et al. |
| 2005/0284854 A1 | * | 12/2005 | Tong et al. ............... 219/130.51 |
| 2006/0226131 A1 | * | 10/2006 | Stava et al. ............... 219/130.33 |

FOREIGN PATENT DOCUMENTS

| | | | | |
|---|---|---|---|---|
| JP | 62161470 A | * | 7/1987 | |
| JP | 3-297560 A | | 12/1991 | |
| JP | 05-069142 A | | 3/1993 | |
| JP | 8-206838 A | | 8/1996 | |
| JP | 10-314948 A | | 12/1998 | |
| JP | 2002-346786 A | | 12/2002 | |
| JP | 2002346786 A | * | 12/2002 | |
| JP | 2005-34868 A | | 2/2005 | |
| JP | 2006-150439 A | | 6/2006 | |

* cited by examiner

Primary Examiner — Mark H Paschall
(74) Attorney, Agent, or Firm — Foley & Lardner LLP

(57) ABSTRACT

A welding method of carrying out an alternating current arc welding by switching polarities of a voltage applied between a wire and workpieces when weld-connecting the workpieces to each other by use of the wire, the workpieces including an aluminum cast material and an aluminum wrought material. In the welding method, the alternating current arc welding is carried out in a way to satisfy $$|B|/(A+|B|) \geq 0.128$$

where A denotes an integrated value of an electric current over a time for which the polarity of the wire is positive, and B denotes an integrated value of an electric current over a time for which the polarity of the wire is negative; and thereby an amount of heat input into the aluminum cast material during the welding is set at not more than 67.8 J/mm$^2$.

5 Claims, 10 Drawing Sheets

WELDING ARTICLE AND WELDING METHOD OF CARRYING OUT AN ALTERNATING CURRENT ARC WELDING

TECHNICAL FIELD

The present invention relates to a welding method of welding aluminum alloy workpieces to each other by use of a filler material when at least one of the workpieces is a cast material.

BACKGROUND ART

A die-cast material which is one of aluminum cast materials and a wrought material such as an aluminum extruded material are both widely used in the fields of automobiles, ships, industrial machines and the like. That is because various thin, complicatedly-shaped and high-precision parts can be made of the die-cast material, and the wrought material has excellent strength characteristics.

In these years, there has been a growing demand for automotive lightening against the background of an increasingly-required environmental quality improvement. As one means for meeting the demand, welded structures each obtained by weld-connecting the above-mentioned die-cast material and wrought material together by arc welding have been increasingly employed as structures constituting vehicle bodies, suspensions and the like.

In addition, to employ these welded structures, it is essential that the reliability of welding quality should be secured, and particularly the welding strength should be secured, because these welded structures need to bear external forces produced while the automobile is running. Specifically, it is essential that, when a welded structure breaks, the breakage should occur only in the die-cast materials or wrought materials.

However, when an aluminum die-cast material and an aluminum wrought material are arc-welded together, the welding strength decreases in the weld zone because a gas contained in the die-cast material creates blowholes in the weld zone.

With this taken into consideration, for example, as disclosed in Japanese Patent Application Publication No. Hei. 8(1996)-206838, when a DC pulsed arc welding is carried out, the blowholes are reduced by agitating the molten weld pool by use of an agitator, heating the molten weld pool by use of a heater, and the like.

Moreover, as disclosed in Japanese Patent Application Publication No. Hei. 10(1998)-314948, a part of an aluminum die-cast member in a vicinity of a boundary between the aluminum die-cast member and an aluminum material to be connected to the aluminum die-cast member is fused by an alternating current TIG arc welding method, and thereby a gas contained in the part of the aluminum die-cast member in the vicinity is released from the part. Once the part of the aluminum die-cast member in this vicinity is solidified, the aluminum die-cast member and the aluminum material to be connected to the aluminum die-cast member are welded by an alternating current TIG filler arc welding method.

In addition, Japanese Patent Application Publication No. 2005-34868 discloses a combination of laser radiation and an arc length oscillation pulse arc welding method. The arc length oscillation pulse arc welding is carried out while irradiating a laser beam to the vicinity of a front boundary between a melted zone and an unmelted zone in a molten pool, so that gas is released from the melted zone with the laser irradiation during the welding.

DISCLOSURE OF THE INVENTION

However, the above-described conventional art has the following problems.

The conventional art described in Japanese Patent Application Publication No. Hei. 8(1996)-206838 needs means for agitating and heating the molten weld pool in addition to a regular arc welding machine. Accordingly, this conventional art needs additional apparatuses and processing steps for reducing the blowholes, hence increasing costs. The additional processing steps increase the processing time, and consequently induce a decrease in production efficiency.

The conventional art described in Japanese Patent Application Publication No. Hei. 10(1998)-314948 needs to fuse the part of the aluminum die-cast member in the vicinity of the front boundary between the aluminum die-cast member and the aluminum material to be connected to the aluminum die-cast member by the arc welding method. This increases the processing time, and accordingly induces a decrease in production efficiency.

The conventional art described in Japanese Patent Application Publication No. 2005-34868 needs means for irradiating the laser beam on the part of the base material in the vicinity of the front boundary between the melted zone and the unmelted zone in the molten pool in addition to the regular welding machine. In this manner, this conventional art needs the additional apparatuses for reducing the blowholes, hence increasing costs.

With these taken into consideration, an object of the present invention is to restrain the occurrence of blowholes in a weld zone by use of only a regular arc welding machine without needing additional apparatuses or processing steps.

An aspect of the present invention is a welding method of carrying out an alternating current arc welding by switching polarities of a voltage applied between a filler material and aluminum alloy workpieces for weld-connecting together the aluminum alloy workpieces by use of the filler material when at least one of the workpieces is a cast material, the welding method being characterized in that the alternating current arc welding is carried out by setting an amount of heat inputted into the cast material during the welding at not more than 67.8 J/mm$^2$ (joule per square millimeter).

Another aspect of the present invention is a welded article to which a welding process is applied by use of the foregoing welding method, the welded article being characterized by satisfying $$E/D<0.168$$

where D denotes an area of a molten metal into which the filler material and the workpieces are melted due to the heat which is inputted into the filler material and the workpieces during the alternating current arc welding when viewed vertically from above, and E denotes a total sum of areas of the respective blowholes existing in an area covering the molten metal and a region of the workpieces in a vicinity of the molten metal, whose crystalline structure changes due to the heat inputted into the region during the welding when viewed vertically from above.

BEST MODE FOR CARRYING OUT THE INVENTION

Descriptions will be provided hereinbelow for the embodiment of the present invention based on the drawings.

Figure 1:
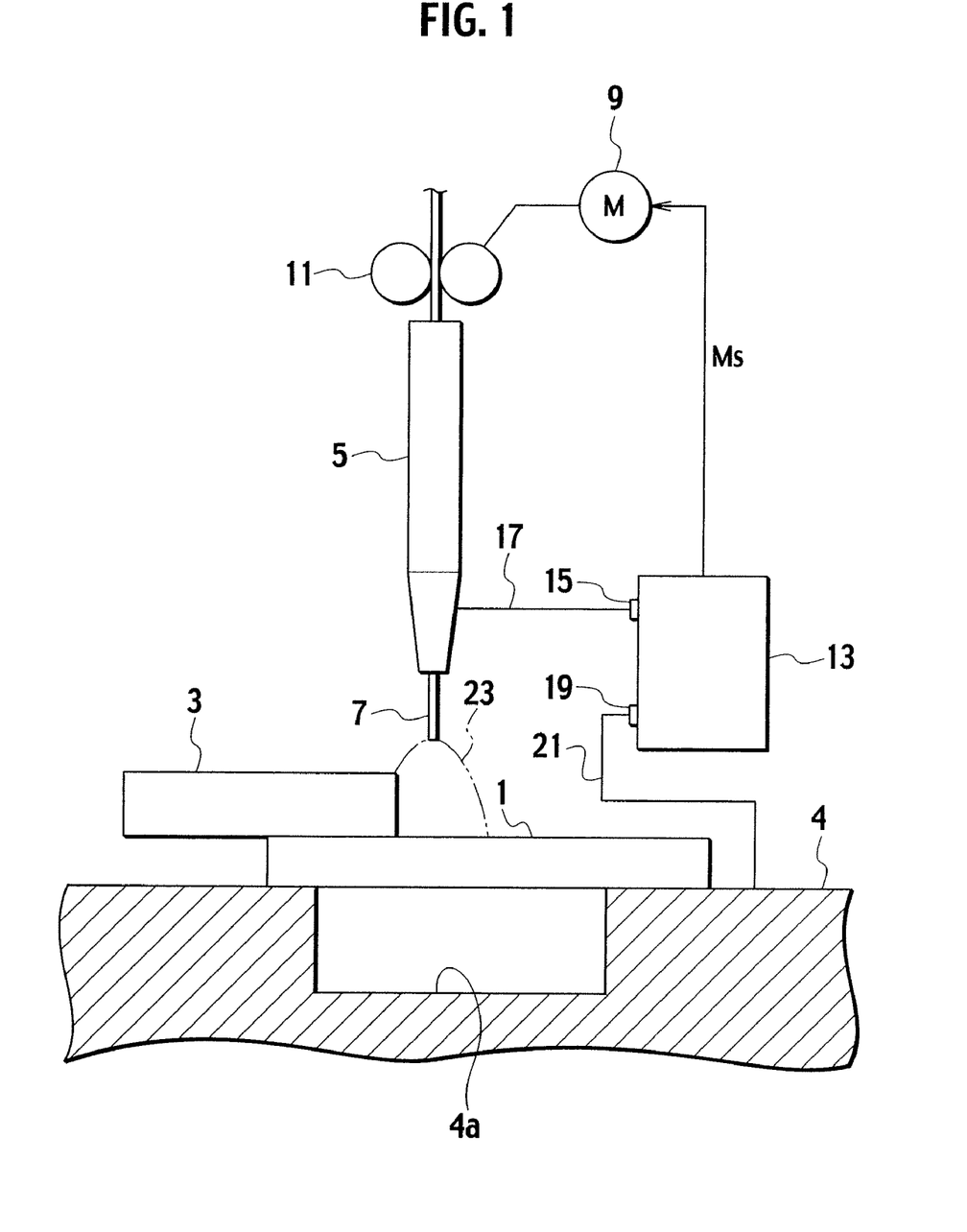
FIG. 1 is a block diagram schematically showing an entire configuration of an alternating current arc welding machine according to an embodiment of the present invention.

FIG. 1 is a block diagram schematically showing an entire configuration of an alternating current arc welding machine, according to the embodiment of the present invention. Workpieces to be welded together by use of this alternating current arc welding machine are a cast material 1 made of an aluminum alloy and a wrought material 3 made of another aluminum alloy. The cast material 1 and the wrought material 3 are overlapped each other. Thereafter, by fillet joint welding, an end portion of the wrought material 3 serving as a plate material is welded onto a surface of the cast material 1 serving as the other plate material. The cast material 1 and the wrought material 3 are placed on a seat 4 working as an electrode. The seat 4 includes a recess 4a corresponding to a zone where an arc 23 is generated, although the arc 23 will be described later.

A welding torch 5 accommodates a welding wire 7 as a filler material in a way that the welding wire 7 is movable in the vertical direction as shown in FIG. 1, and sequentially feeds out this wire 7 from its lowermost end toward a weld zone under the welding torch 5. Paired wire feeding rollers 11 which are rotated by a wire feeding motor 9 are placed above the welding torch 5. The rotation of the wire feeding rollers 11 feeds out the wire 7 downward.

The above wire feeding motor 9 is driven by receiving a feed controlling signal Ms transmitted from a weld power supply unit 13, and thus rotates the wire feeding rollers 11.

One electrode terminal 15 of the welding power supply unit 13 is connected to the welding torch 5 with a cable 17, and the other electrode terminal 19 of the welding power supply unit 13 is connected to the seat 4 with a cable 21.

Figure 2:
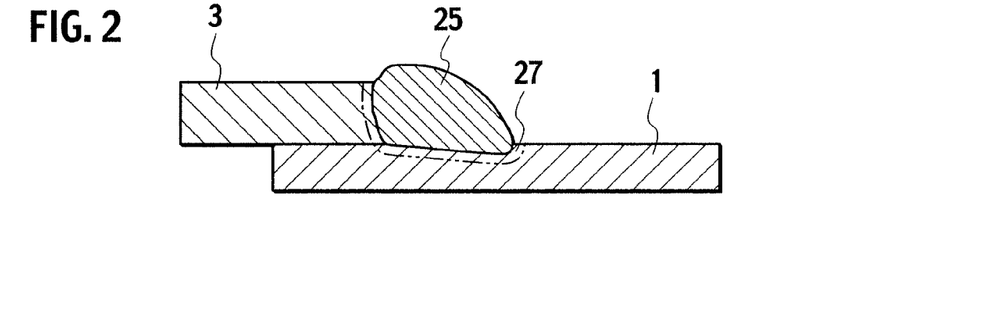
FIG. 2 is a cross-sectional view showing how the arc welding machine as shown in FIG. 1 welds a cast material and a wrought material together by lap fillet joint welding.

In this configuration, the welding power supply unit 13 outputs a welding voltage V between these electrode terminals 15 and 19. Thereby, the arc 23 is generated among the cast material 1, the wrought material 3, and the front end of the welding wire 7 fed out from the welding torch 5. As a result, the cast material 1, the wrought material 3 and the wire 7 are molten, and form a molten metal 25 as shown in FIG. 2. Thereby, the cast material 1 and the wrought material 3 are weld-connected together. At this time, the molten metal 25 has, in its surrounding area, a heat-affected portion 27, in which the crystalline structures of the respective workpieces (the cast material 1 and the wrought material 3) change due to the heat input during the welding. In this heat-affected portion 27, the workpieces are not molten, but the crystalline structures of the workpieces change only. Thereby, the workpieces maintains their solid conditions.

Figure 3:
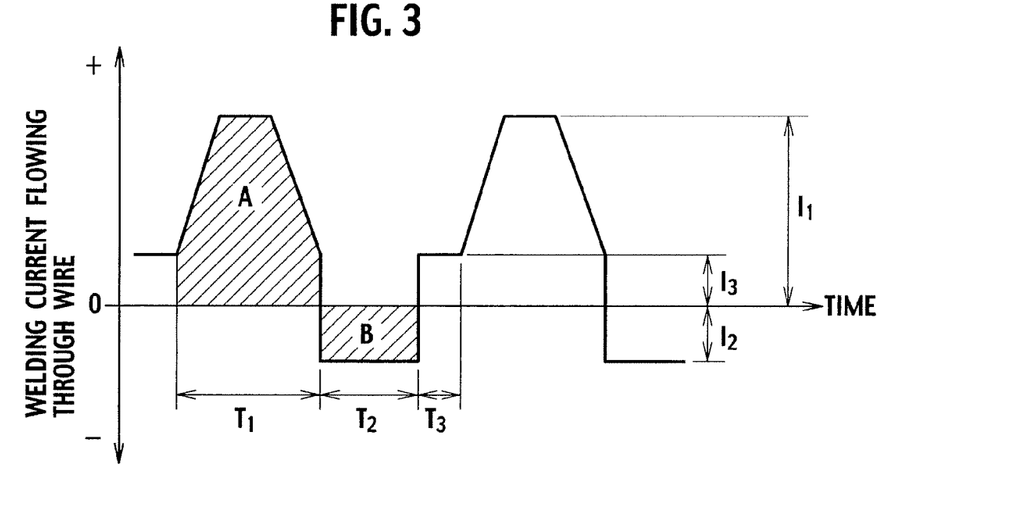
FIG. 3 shows a waveform of a welding current flowing through a wire, supplied from a welding power supply unit as shown in FIG. 1.

FIG. 3 shows a waveform of a welding current flow through the wire 7, supplied from the welding power supply unit 13. In FIG. 3, T1 denotes a time length for which the polarity of the wire 7 is positive, and T2 denotes a time length for which the polarity of the wire 7 is negative. In addition, T3 denotes a time length for which a base current flows through the wire 7. I1, I2 and I3 denote values representing electric currents flowing through the wire 7 for times T1, T2 and T3, respectively.

In FIG. 3, one cycle of electric current flow is a summation of time T1 and time T2. This one cycle of electric current flow is set in a way that the cycle satisfies $$|B|/(A+|B|) \geq 0.128$$

where A denotes an integrated value of an electric current over the time T1 for which the polarity of the wire 7 is positive, and |B| denotes an integrated value of an electric current over the time T2 for which the polarity of the wire 7 is negative.

Here, a ratio obtained by dividing the value |B| representing the integral of the electric current over the time T2 for which the polarity of the wire 7 is negative, by the value (A+|B|) in one cycle of electric current flow (T1+T2), is defined as a polarity ratio C. By adjusting this polarity ratio C to set C at 0.128 or more as described above, an amount of heat input in the workpieces, particularly into the cast material 1 containing a gas inside is reduced to 67.8 J/mm² (corresponding to an amount of heat input per unit plate thickness inputted thereto). This restrains an occurrence of blowholes in the molten metal 25 and in the heat-affected portion 27.

In each cycle (T1+T2) of electric current flow which has been described above, a time for which the polarity of the wire 7 is positive and a time for which the polarity of the wire 7 is negative occur alternately, and this alternation is repeated. Instead of this, one cycle may be defined in a different manner. For example, times each for which the polarity of the wire 7 is positive may be continuously imparted in a pulsed manner; and a time for which the polarity of the wire 7 is positive and a time for which the polarity of the wire 7 is negative may be alternately imparted as shown in FIG. 3. Accordingly, one cycle may include a time region where times each for which the polarity of the wire 7 is positive appears continuously in a pulsed manner; and a time region where a time for which the polarity of the wire 7 is positive and a time for which the polarity of the wire 7 is negative alternately and repeatedly appear. The waveform is adjusted so that one cycle of electric current flow defined in this manner satisfies $|B|/(A+|B|) \geq 0.128$ where A is an integrated value of an electric current over the time T1 for which the polarity of the wire 7 is positive, and B is an integrated value of an electric current over the time T2 for which the polarity of the wire 7 is negative.

In essence, the electric current flow waveform according to the present embodiment is not limited to the electric current flow waveform shown in FIG. 3. Any waveform serves the purpose of the present embodiment as long as the waveform satisfies $|B|/(A+|B|) \geq 0.128$ where A is an integrated value an electric current over a time for which the polarity of the wire 7 is positive, and $|B|$ is an integrated value of an electric current over a time for which the polarity of the wire 7 is negative.

In arc welding, as described above, the connecting is performed firstly by causing an electric current to flow between the workpieces and a welding wire that constitutes an electrode. This induces a thermal energy of arc plasma that melts the welding wire 7 and the workpieces (the cast material 1 and the wrought material 3). Once this molten metal containing these three metals is solidified, the weld zone (the molten metal 25) is formed, and consequently the paired cast material 1 and wrought material 3 are connected together.

In addition, the shape of the molten metal 25 largely depends on the amount of electric current flowing between the welding wire 7 constituting one electrode and the paired workpieces, and on a current flow direction in which the electric current flows corresponding to the polarities set for the electrodes. Specifically, a value representing the electric current is a factor related to the amount of thermal energy of the arc plasma used to melt the three metals, whereas the current flow direction is a factor related to distribution of the thermal energy of the arc plasma among the wire constituting the one electrode and the workpieces.

The current flow direction is determined depending on which polarity is set for the wire. When the polarity of the wire is used as a reference, there are two types of current flow direction: one is a reverse-polarity current flow direction which is determined when the positive polarity is set for the wire; and the other is a straight-polarity current flow direction which is determined when the negative polarity is set for the wire. The amount of thermal energy of the arc plasma which is distributed among the wire and the paired workpieces is different between the reverse-polarity current flow direction and the straight-polarity current flow direction.

A characteristic of the reverse-polarity current flow direction where the polarity of the wire is positive is that a larger amount of thermal energy is allotted to the cast material 1 serving as a base material constituting the negative electrode for emitting electrons hence mainly heating and melting the base material. On the other hand, a smaller amount of thermal energy is allotted to the wire constituting the positive electrode, and thus the front end portion of the wire into which the electron flows is concentratedly heated and melted, so that the wire melts in a smaller amount.

In contrast, a characteristic of the straight-polarity current flow direction where the polarity of the wire is negative is that an amount of thermal energy is allotted mainly to the wire constituting the negative electrode; that electrons are emitted from the entire wire including its front end portion; that the entire wire therefore melts; and consequently, a molten amount of wire increases. On the other hand, at this time, the base material melts mainly by the heat indirectly inputted into the base material in conjunction with the melting heat with which the wire is melted into the molten metal splashing and adhering to the base material. Accordingly, the base material is heated and melted in a smaller extent.

Now, an explanation for the difference between the reverse-polarity current flow direction and the straight-polarity current flow direction will be given below based on the welding phenomenon. In the case of the reverse-polarity current flow direction where the polarity of the wire is positive, the heating and melting take place chiefly in the base material. For this reason, the aluminum cast material 1 melts in a larger amount. As a result that most of the gas contained in the aluminum cast material 1 is separated out into the molten metal 25, the amount of blowholes appearing in molten metal 25 increases. In addition, since the aluminum cast material 1 as the base material is directly heated, some of the gas contained in the aluminum cast material 1 is separated out into the heat-affected portion 27 around the molten metal 25. As a consequence, blowholes appear in the heat-affected portion as well.

In contrast, in the case of the positive-polarity current flow direction where the polarity of the wire is negative, the heating and melting take place chiefly in the wire 7, and the source of heat for heating and melting the base material is the heat indirectly inputted into the base material when the molten metal into which the wire is melted is splashed and adhered to the base material. As a result, blowholes in the molten metal 25 decreases in amount because the amount of molten base material is smaller. In addition, the amount of gas separated out from the base material into the heat-affected portion 27 also decreases because the base material is less heated. Accordingly, the amount of blowholes occurring in the heat-affected portion decreases as well.

In the present embodiment, as shown in FIG. 3, the mutual relationship between the reverse-polarity current flow direction where the polarity of the wire 7 is positive and the straight-polarity current flow direction where the polarity of the wire 7 is negative, is set in a way that the polarity ratio C is equal to or above 0.128, the polarity ratio being obtained by dividing the value $|B|$ representing the integral of an electric current over the time T2 for which the polarity of the wire 7 is negative, by the value $(A+|B|)$ representing the integral of one cycle of electric current flow (T1+T2).

Figure 4:
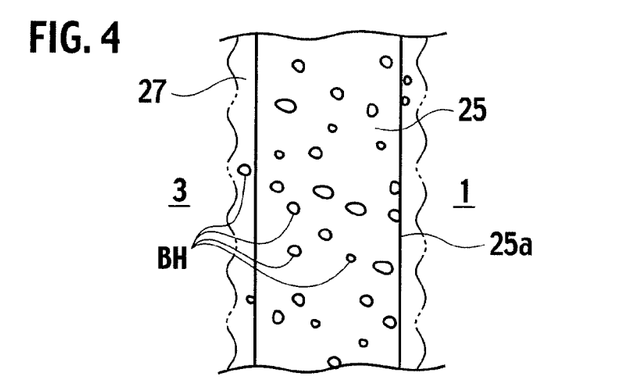
FIG. 4 is a drawing representing a radiographic image obtained by projecting an X-ray onto the molten metal and the heat-affected portion, which are shown in FIG. 2, downward from above after the welding, as an example of calculation of the density of blowholes.

FIG. 4 shows a radiographic image obtained by projecting an X-ray onto the molten metal 25 and the heat-affected portion 27 around the molten metal 25 downward from above as shown in FIG. 2 after the welding, as an example of calculation of the density of blowholes in the molten metal 25 and the heat-affected portion 27. Here, the density F of blowholes is defined as an area ratio E/D obtained by dividing a total sum E of areas of the respective blowholes BH, in a plan view, formed in the molten metal 25 and the heat-affected portion 27, by an area D of the molten metal 25 (an entire inner area surrounded by line 25a indicating the outer periphery of the molten metal 25) in the plan view.

In this case, in the present embodiment, the blowhole density F is set at less than 0.168 by setting the polarity ratio C at not less than 0.128, and also by setting the amount of heat input into the cast material 1 at not more than 67.8 $J/mm^2$. This setting prevents an adverse effect of the blowholes on the welding strength.

Next, descriptions will be provided for a relationship between the amount of heat input into the cast material 1 and the polarity ratio serving as a factor for controlling the amount of the heat input, according to the present embodiment.

Figure 5:
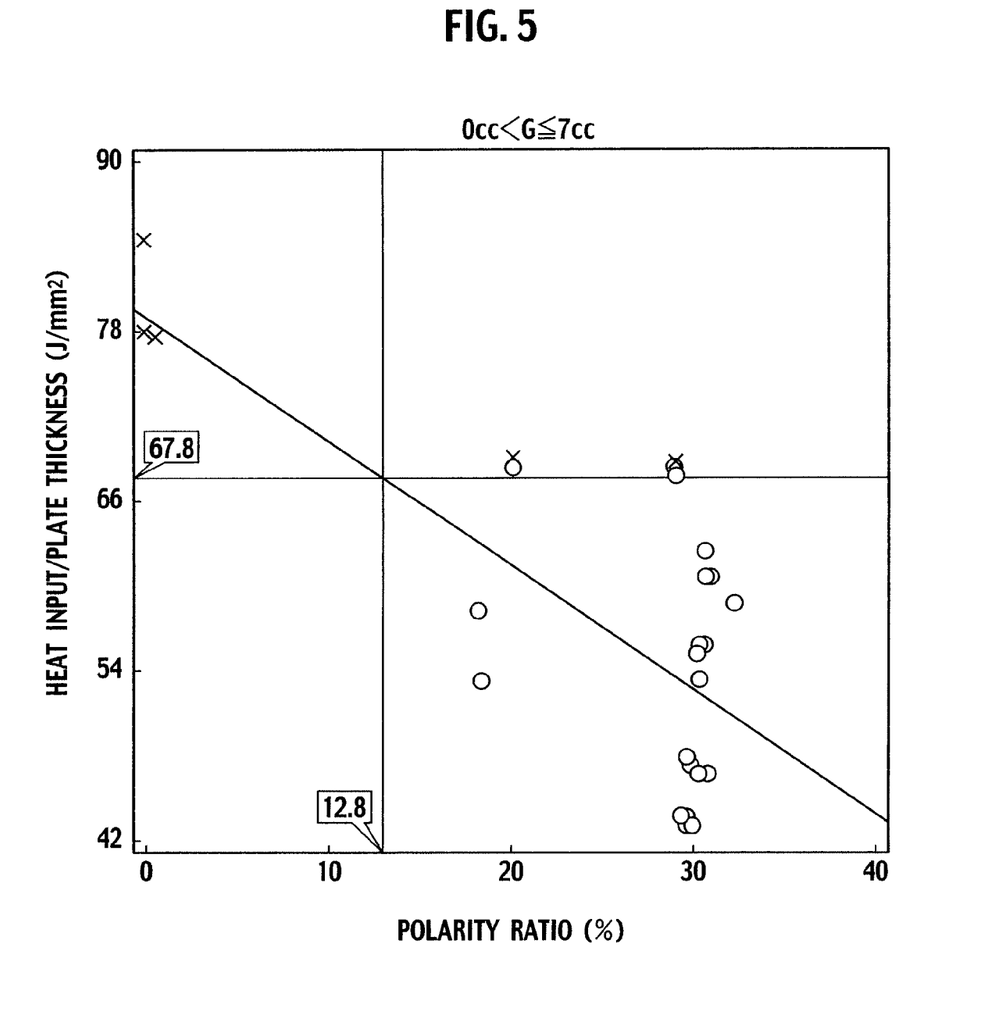
FIG. 5 is a graph showing what correlation exists between an amount of heat per unit plate thickness inputted into the cast material and a polarity ratio during a welding time when a welded article is broken.

FIG. 5 is a graph that shows the types of breakage occurring when a certain external force is applied to the workpieces. In the graph, the vertical axis (Y) indicates the amount of heat input (unit: J/mm², corresponding to the amount of heat per unit plate thickness inputted) into the cast material 1, and the horizontal axis (X) indicates the polarity ratio C (here, indicated is a value in percentage % that is obtained by multiplying the polarity ratio C by 100). In this graph, each cross sign (×) indicates a breakage of the molten metal 25 (hereinafter referred to as a "bead breakage"), and each white circle (○) indicates a breakage of the cast material 1 (hereinafter referred to as a "base material breakage").

The amount of heat input per unit plate thickness (unit: J/mm²) into the cast material 1 is a value obtained by dividing a value expressed by current value (A)×voltage value (V)×(1-polarity ratio)/welding speed (mm/sec) by a plate thickness (mm) of the cast material 1.

Note that, in the case shown in FIG. 5, the gas amount G contained in the cast material 1 is set at 0 cc<G≦7 cc.

In FIG. 5, the three data on the vertical axis representing 0% of the polarity ratio C are obtained by direct current (DC) pulsed welding. Following the below equation, as the polarity ratio C on the horizontal axis is progressively increased, the amount of heat input per unit plate thickness in the cast material 1 decreases, which in turn indicates that the amount of the heat input can be controlled by the polarity ratio C.

$$Y=78.746-0.869X$$

As shown in FIG. 5, the base material breakage type indicated by the white circles (○) can be realized by setting the amount of heat input per unit plate thickness at 67.8 J/mm² or less. In addition, it is indicated by the foregoing equation that setting the amount of heat input per unit plate thickness at 67.8 J/mm² or less requires the polarity ratio C to be set at 12.8% or more.

Note that a thermal efficiency during the welding is not taken into consideration for the amount of heat input which has been discussed here. For this reason, when the thermal efficiency is taken into consideration, the amount of heat input per unit plate thickness (unit: J/mm²) needs to be multiplied by a thermal-efficiency coefficient η. For example, in the case where a MIG welding is carried out, η=0.7. Thus, the amount of heat input per unit plate thickness is becomes 67.8×0.7=47.46 J/mm² or less.

Materials whose compositions are shown in Table 1 are used for the cast material 1, the wrought material 3, and the wire 7 which are made of the respective aluminum alloys used in this embodiment.

graphs, the horizontal axis indicates the amount of heat input (unit: J/mm²) into the cast material (base material) 1, and the vertical axis indicates the blowhole density F (here, indicated is a value in percentage % that is obtained by multiplying the density F of blowholes by 100). Note that, through the Ransley method, the measurement of the gas amount is carried out while using a sample obtained from a vicinity of the weld zone.

Figure 6:
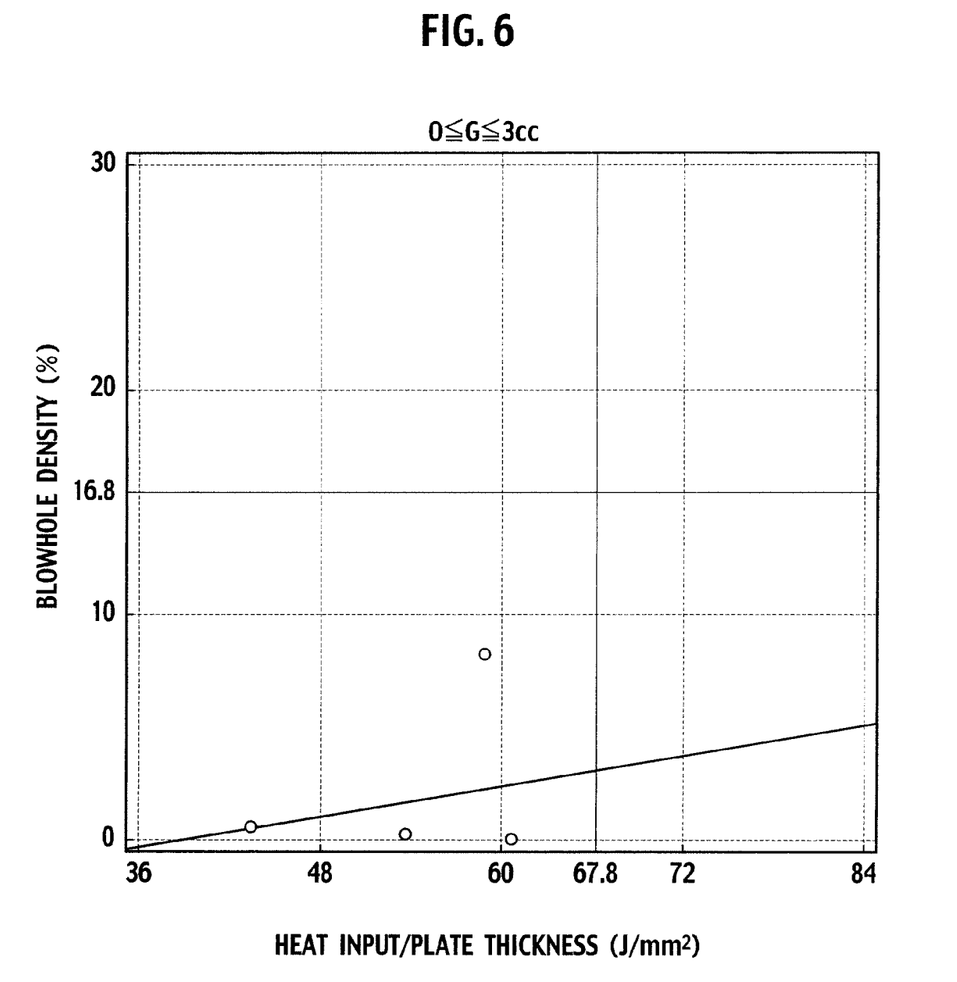
FIG. 6 is a graph showing a correlation between an amount of heat input and a density of the blowholes when an amount of gas contained in a cast material is 0 cc (cubic centimeter) or more but not more than 3 cc.

FIG. 6 shows the above-mentioned gas amount G is as extremely small as 0 cc to 3 cc for each 100 g (gram) of the cast material. In this case, the blowhole density is less than an upper limit which is equal to 16.8% even when the amount of heat input is approximately 78 to 84 J/mm² which causes the bead breakages and is equivalent to that of the DC pulsed welding as shown in FIG. 5. Consequently, base material breakage type indicated by white circles (○) is obtained.

The fact that the above-mentioned gas amount G is 0 cc to 3 cc for each 100 g of the cast material implies that the gas amount contained in the cast material is extremely small, which in turn increases the casting costs, and causes disadvantages in the quality control.

Figure 7:
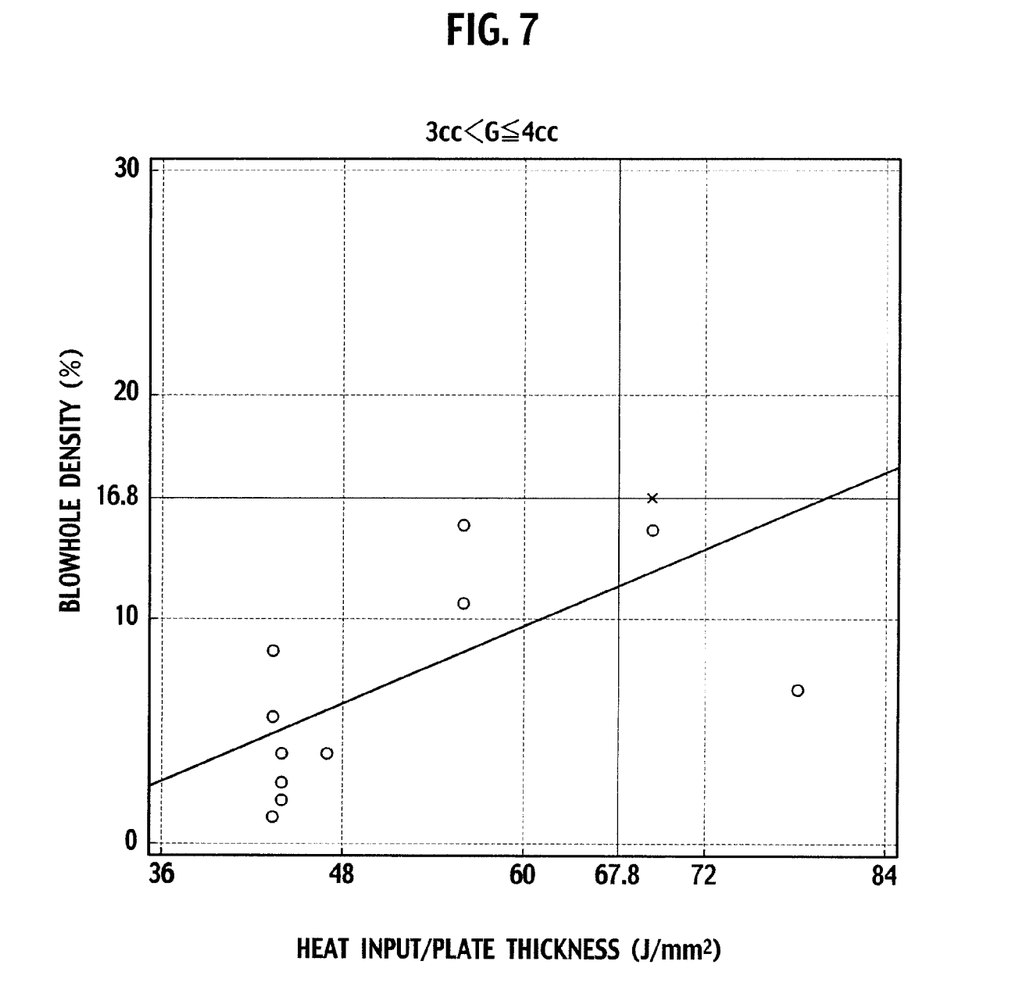
FIG. 7 is a graph showing a correlation between an amount of heat input and a density of the blowholes when an amount of gas contained in a cast material is more than 3 cc but not more than 4 cc.

FIG. 7 is a case where the gas amount G contained in the cast material meets 3 cc<G≦4 cc for each 100 g of the cast material. In this case, FIG. 7 shows that base material breakage type indicated by the white circles (○) are obtained when the blowhole density is less than 16.8%, and when the amount of heat input is 67.8 J/mm² or less. In addition, FIG. 7 also shows that, the amount of heat input of approximately 78 J/mm² but not more than approximately 84 J/mm², which equivalent to that of the DC pulsed welding, is not enough to satisfy the condition for base material breakages that the blowhole density should be less than 16.8%.

FIGS. 6 and 7 shows that, the amount of gas contained in the base material needs to be 3 cc or less in order to obtain the base material breakage type when the amount of heat input into the cast material is 78 to 84 J/mm² corresponding to the amount of heat input for the DC pulsed welding.

Figure 8:
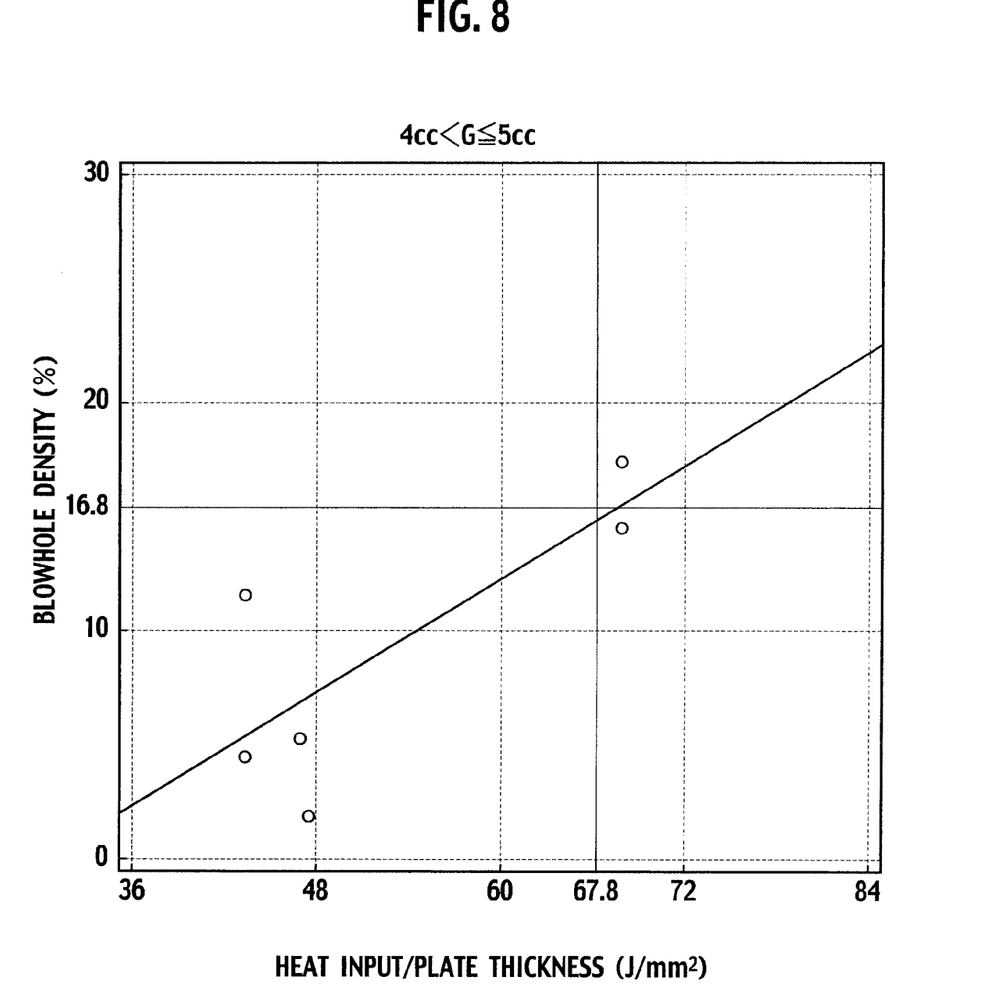
FIG. 8 is a graph showing a correlation between an amount of heat input and a density of the blowholes when an amount of gas contained in a cast material is more than 4 cc but not more than 5 cc.
Figure 9:
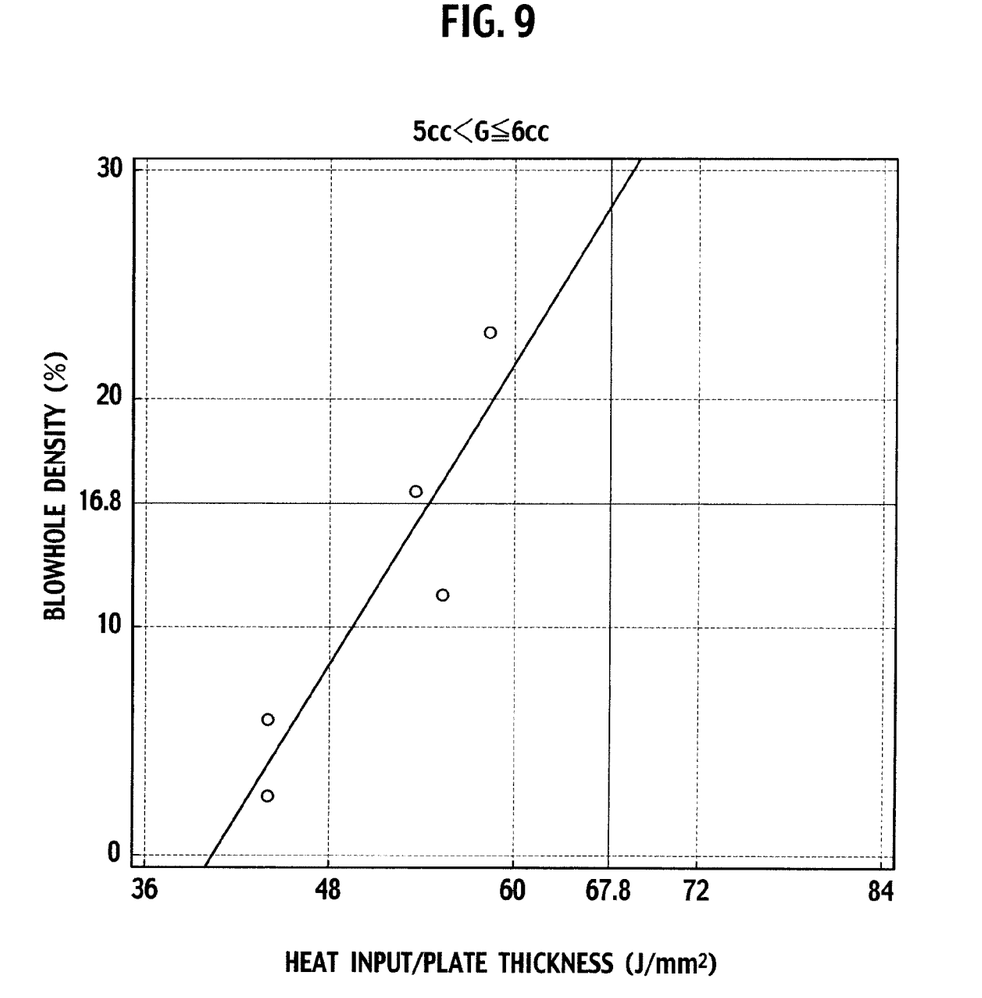
FIG. 9 is a graph showing a correlation between an amount of heat input and a density of the blowholes when an amount of gas contained in a cast material is more than 5 cc but not more than 6 cc.

FIG. 8 is a case where the gas amount G contained in the cast material meets 4 cc<G≦5 cc for each 100 g of the cast material. FIG. 9 is a case where the gas amount G contained in the cast material meets 5 cc<G≦6 cc for 100 g of the cast material. In both cases, it is shown that base material breakage type indicated by the white circles (○) are obtained when the amount of heat input is 67.8 J/mm² or less, and when the blowhole density is less than 16.8%.

Figure 10:
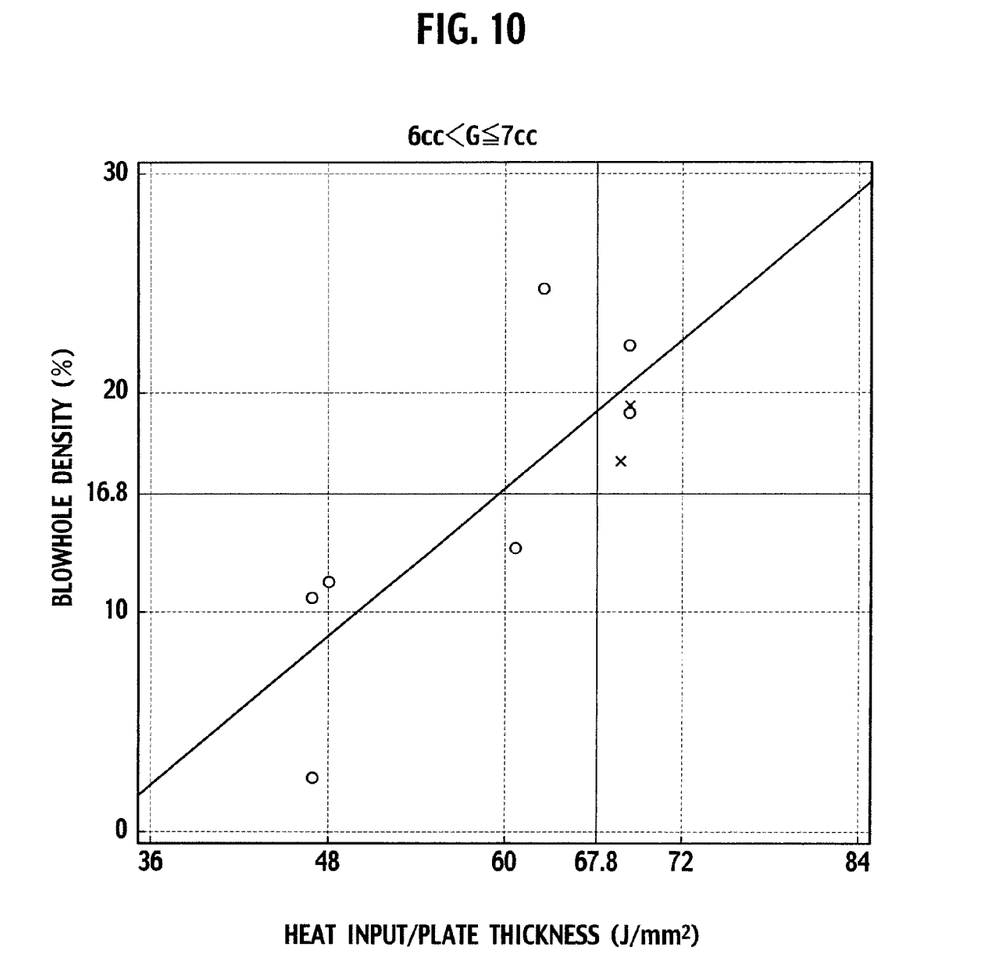
FIG. 10 is a graph showing a correlation between an amount of heat input and a density of the blowholes when an amount of gas contained in a cast material is more than 6 cc but not more than 7 cc.

FIG. 10 is a case where the gas amount G contained in the cast material meets 6 cc<G≦7 cc for each 100 g of the cast material. In this case, FIG. 10 shows that base material break-

TABLE 1

| | | | | | | | | | Unit: mass % |
|---|---|---|---|---|---|---|---|---|---|
| Mn | Cu | Si | Mg | Zn | Fe | Mn | Ti | Sr | Rest |
| Wrought Material | 0.1 | 0.25 | 2.4 to 3.0 | 0.25 | 0.4 | 0.50 to 1.0 | 0.2 | — | AL |
| Cast Material | 0.03 or less | 9.5 to 11.5 | 0.1 to 0.5 | 0.08 or less | 0.15 or less | 0.5 to 0.8 | 0.04 to 0.15 | 0.01 to 0.02 | AL |
| Welding Wire | 0.10 or less | 0.25 or less | 2.4 to 3.0 | 0.25 or less | 0.40 or less | 0.5 to 1.0 | 0.05 to 0.20 | — | AL |

Each of FIGS. 6 to 12 are graphs that show the types of breakage with regard to a mutual relationship between the amount of heat input into the cast material 1 and the density of blowholes when the gas amount G contained in the cast material (base material) 1 varies from one to another. In the age type indicated by the white circles (○) are obtained when the amount of heat input is 67.8 J/mm² or less, and when the blowhole density is less than 16.8%, as in the cases shown in FIGS. 8 and 9 where 4 cc<G≦5 cc and 5 cc<G≦6 cc, respectively.

Figure 11:
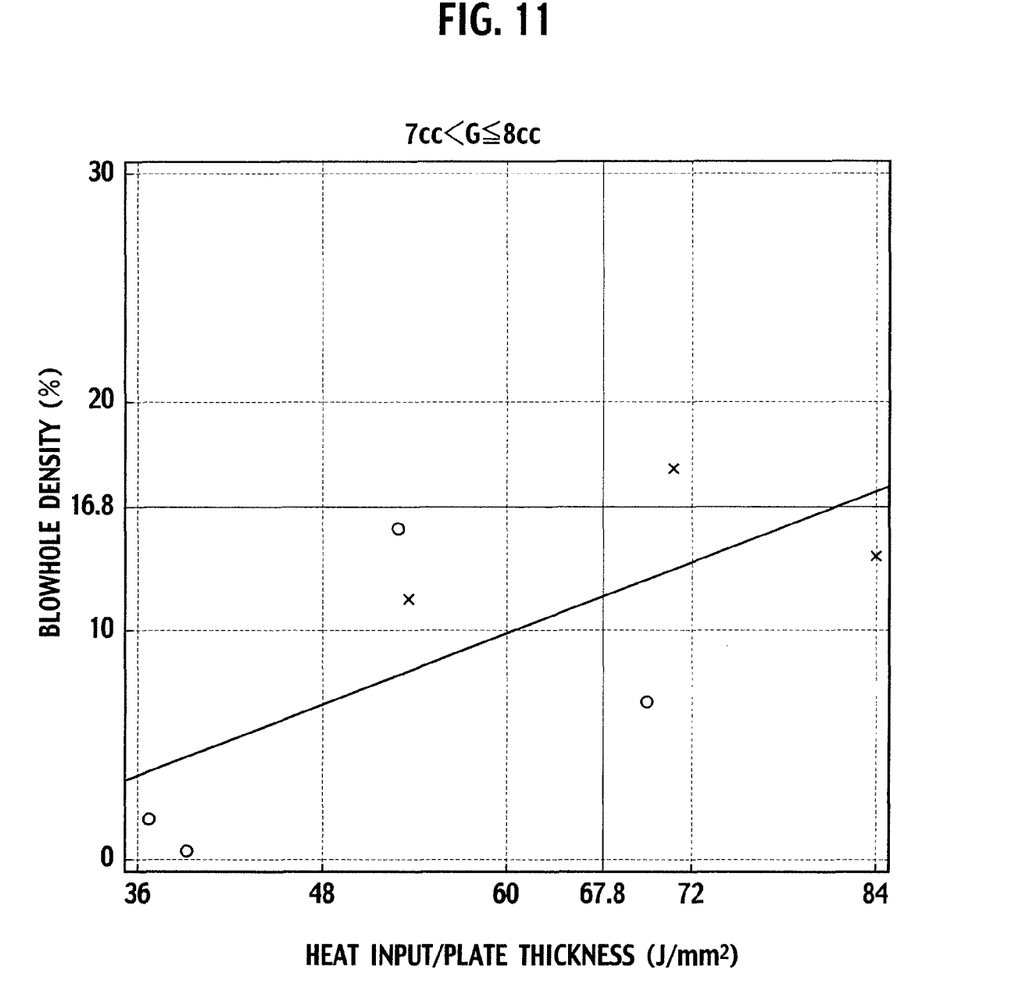
FIG. 11 is a graph showing a correlation between an amount of heat input and a density of the blowholes when an amount of gas contained in a cast material is more than 7 cc but not more than 8 cc.

FIG. 11 is a case where the gas amount G contained in the cast material meets 7 cc<G≦8 cc for each 100 g of the cast material. Once the gas amount G exceeds 7 cc, a bead breakage type indicated by the cross (×) is observed when the amount of heat input is 67.8 J/mm² or less, and when the blowhole density is less than 16.8%.

Judging from this, even in a case where the gas amount G contained in the cast material 1 is 7 cc for each 100 g of the cast material 1 at the most so that the costs of casting the cast material 1 is decreased and where the work needed for the quality control is reduced, base material breakage type can be obtained by setting the amount of heat input into the cast material 1 at 67.8 J/mm² or less, and the density of blowholes at less than 16.8%.

Figure 12:
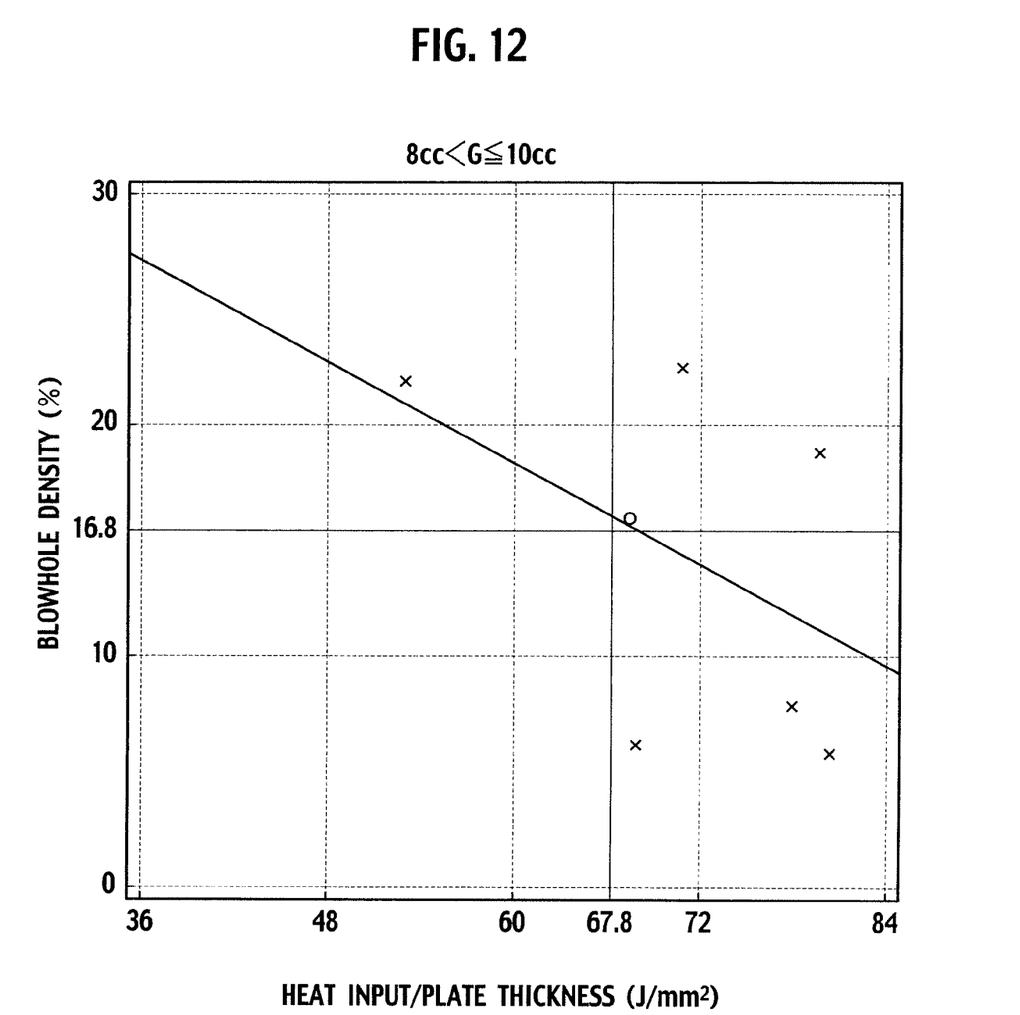
FIG. 12 is a graph showing a correlation between an amount of heat input and a density of the blowholes when an amount of gas contained in a cast material is more than 8 cc but not more than 10 cc.

FIG. 12 is a case where the gas amount G contained in the cast material meets 8 cc<G≦10 cc for each 100 g of the cast material. In this case, there is no condition for the heat input and the blowhole density for obtaining a base material breakage type. In addition, the correlation between the amount of heat input and the blowhole density is reverse to the case where the gas amount G is 8 cc. Thus, it is impossible to explain the blowhole density by the amount of heat input theoretically. For this reason, the case in FIG. 12 falls outside the scope to which the present invention is applicable.

Going through FIGS. 6 to 12, it is observed that the rate of increase in the blowhole density along with the increase in the amount of heat input, increases along with the increase in the gas amount G from 3 cc in FIG. 6 to 6 cc in FIG. 9. FIGS. 6 to 12 show that the amount of heat input and the gas amount G each have a positive correlation with the blowhole density.

If the gas amount G increases to the range in which the gas amount G satisfies 6 cc<G≦7 cc for each 100 g of the cast material, this increase not even enhances but, on the contrary, decreases the rate of increase in the blowhole density along with the increase in the amount of heat input. Nevertheless, the allowable range of conditions of the blowhole density and the amount of heat input for obtaining a base material breakage type is still within the scope to which the present invention is applicable.

In the range in which the gas amount G exceeds 7 cc, no base material breakage type can be controlled by the amount of heat input or the blowhole density. Consequently, it will be assumed that the breakage type is involved with a factor other than the blowhole density, which in turn indicates that such case is outside the scope to which the present invention is applicable.

In essence, the gist of the present invention is to lower the density of blowholes caused in the weld zone down to or lower than the density where a base material breakage type can be obtained, by controlling the amount of heat input into the aluminum cast material as the base material during the welding, in the case where the aluminum cast material and the aluminum wrought material are connected to each other by arc welding.

Factors directly related to the development of the blowholes are the gas amount G contained in the cast base material that is the source of the blowholes; and the amount of heat input into the base material that is related to the amount of gas to be separated out. In the present invention, as described above, while the alternating current arc welding is carried out, the blowhole density is caused to be less than 16.8% by setting the polarity ratio at 0.128 or more, and by setting the amount of heat input in the cast base material at 67.8 J/mm² or less.

In this respect, the upper limit of the gas amount G contained in the base material directly related to the setting of the blowhole density at less than 16.8% is 7 cc for each 100 g of the base material as described above.

This upper limit of such gas amount is more than the double of the limit value of the gas amount contained in the base material for the DC pulsed welding, which is 3 cc. In this manner, the present invention is capable of setting the density of blowholes at less than 16.8% by setting the polarity ratio at 0.128 or more, and by setting the amount of heat input into the base material at 67.8 J/mm² or less while the alternating current arc welding is carried out, even though the gas amount G contained in the cast material is as large as 7 cc for each 100 g of the cast material. Thereby, the present invention offers the base material breakage type. Consequently, the present invention reduces the cost of casting the cast material and the welding costs, and facilitates the quality control, as well as increases the productivity.

In general, in the case of welded structures, and particularly in the case of structures such as a vehicle body and suspensions of an automobile, it is essential that the reliability of the welding quality be secured, and the welding strength be particularly secured, since such structures receive external forces when a vehicle is running. Specifically, it is essential that, as a breakage type, the base material should break, but not the molten metal 25.

The present invention is capable of offering base material breakage type by setting the polarity ratio at 0.128 or more, and thus secures the welding strength.

The example of connecting the cast material 1 and wrought material 3 together by lap fillet joint welding has been shown as the embodiment. However, it should be noted that the present invention is applicable to all the arc weld joint types which are adopted for welding an aluminum cast material and an aluminum wrought material together, and that the arc weld joint types include butt joint, T joint, cruciform joint, corner joint and edge joint and the like.

A welded article manufactured by use of the method according to the present invention is capable of avoiding the influence of blowholes on the welding strength by setting the blowhole density F at less than 0.168.

INDUSTRIAL APPLICABILITY

Since the present invention causes the alternating current arc welding to be carried out by setting the amount of heat input into a cast material containing a gas at 67.8 J/mm² or less during the welding, the present invention is capable of preventing the heat from being inputted into the cast material, and thus capable of preventing blowholes from being developed in a molten metal and in a heat-affected portion surrounding the molten metal, whose crystalline structure changes. Thereby, the present invention is capable of increase the strength of a weld zone. At this time, the present invention needs only a regular arc welding machine, and needs no additional apparatuses or processing steps.

The invention claimed is:

1. A welding method of carrying out an alternating current arc welding, comprising:
   switching polarities of a voltage applied between a filler material and aluminum alloy workpieces when weld-connecting the aluminum alloy workpieces to each other by use of the filler material, wherein at least one of the aluminum alloy workpieces is a cast material; and
   setting an amount of a heat input into the cast material during the weld-connecting to not more than 67.8.1/mm².

2. The welding method according to claim 1, wherein the alternating current arc welding is carried out in a way to satisfy $$|B|/(A+|B|) \geqq 0.128$$

where A denotes an integrated value of an electric current over a time for which a polarity of the filler material is positive, and B denotes an integrated value of the electric current over a time for which the polarity of the filler material is negative.

3. The welding method according to claim 1, further comprising setting an amount of gas contained in the cast material at 7 cc at a maximum for each 100 g of the cast material.

4. The welding method according to claim 1, wherein one of the aluminum alloy workpieces is a first plate material made of the cast material, and the other of the aluminum alloy workpieces is a second plate material made of a wrought material, and wherein an end portion of the first plate material is welded onto the second plate material or an end portion of the second plate material is welded onto the first plate material by lap fillet joint welding when the first plate material and the second plate material overlap.

5. A welded article to which a welding process is applied by use of the welding method according to claim 1, the welded article satisfying $$E/D < 0.168$$

where D denotes an area, in a plan view, of a molten metal into which the filler material and the aluminum alloy workpieces are melted by a heat inputted into the filler material and the aluminum alloy workpieces during the alternating current arc welding, and E denotes a total sum of the area, in the plan view, of blowholes existing in an area, in the plan view, of the molten metal and a region of the aluminum alloy workpieces in a vicinity of the molten metal, whose crystalline structure is changed by the heat input during the weld-connecting.

* * * * *